(12) United States Patent
Smith (10) Patent No.: US 9,331,997 B2
(45) Date of Patent: *May 3, 2016

(54) SYSTEMS AND METHODS FOR MANAGING DISCLOSURE OF PROTECTABLE INFORMATION

(71) Applicant: TASER International, Inc., Scottsdale, AZ (US)

(72) Inventor: Patrick W. Smith, Scottsdale, AZ (US)

(73) Assignee: TASER International, Inc., Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/692,528

(22) Filed: Apr. 21, 2015

(65) Prior Publication Data

US 2015/0229630 A1 Aug. 13, 2015

Related U.S. Application Data

(63) Continuation of application No. 13/801,752, filed on Mar. 13, 2013, now Pat. No. 9,058,499, which is a continuation of application No. 12/340,963, filed on Dec. 22, 2008, now Pat. No. 9,003,474.

(60) Provisional application No. 61/091,267, filed on Aug. 22, 2008.

(51) Int. Cl.
| | |
|---|---|
| *H04L 29/06* | (2006.01) |
| *G06F 21/00* | (2013.01) |
| *G06F 17/30* | (2006.01) |
| *H04L 29/08* | (2006.01) |
| *H04L 9/08* | (2006.01) |
| *G06F 17/00* | (2006.01) |
| *G06F 21/60* | (2013.01) |
| *H04L 9/32* | (2006.01) |
| *G06F 17/22* | (2006.01) |
| *G06F 21/62* | (2013.01) |

(52) U.S. Cl.
CPC .............. *H04L 63/08* (2013.01); *G06F 17/00* (2013.01); *G06F 17/2235* (2013.01); *G06F 17/30* (2013.01); *G06F 17/30864* (2013.01); *G06F 17/30887* (2013.01); *G06F 21/00* (2013.01); *G06F 21/606* (2013.01); *G06F 21/6263* (2013.01); *H04L 9/08* (2013.01); *H04L 9/32* (2013.01); *H04L 67/10* (2013.01); *H04L 67/42* (2013.01); *H04L 69/329* (2013.01)

(58) Field of Classification Search
CPC ........... H04L 9/32; H04L 63/08; H04L 67/10; G06F 17/30; G06F 21/00; G06F 17/00; G06F 17/30887; G06F 17/2235
See application file for complete search history.

(56) References Cited

U.S. PATENT DOCUMENTS

| | | | |
|---|---|---|---|
| 5,263,158 | A | 11/1993 | Janis |
| 5,412,717 | A | 5/1995 | Fischer |
| 5,696,898 | A | 12/1997 | Baker |
| 5,826,258 | A | 10/1998 | Gupta |
| 6,658,400 | B2 | 12/2003 | Perell |
| 6,986,009 | B1 | 1/2006 | Lecrone |
| 7,043,752 | B2 | 5/2006 | Royer |
| 7,237,117 | B2 | 6/2007 | Weiss |

(Continued)

*Primary Examiner* — Mohammad A Siddiqi
(74) *Attorney, Agent, or Firm* — Laurence Letham (57) ABSTRACT

A server and one or more portals cooperate with a first registered agency, an administrator of the first registered agency, a second agency, and an administrator of the second registered agency to determine whether access to protectable information should be granted to a registered requester.

15 Claims, 4 Drawing Sheets

(56) References Cited

U.S. PATENT DOCUMENTS

| | | |
|---|---|---|
| 7,308,498 B1 | 12/2007 | Olsen |
| 7,424,473 B2 | 9/2008 | Orton |
| 7,761,308 B2 | 7/2010 | Falchuk |
| 7,761,591 B2 | 7/2010 | Graham |
| 9,003,474 B1 * | 4/2015 | Smith ............... H04L 67/42 707/E17.108 |
| 9,058,499 B1 * | 6/2015 | Smith ............... H04L 67/42 |
| 2001/0027451 A1 | 10/2001 | Taguchi |
| 2002/0055935 A1 | 5/2002 | Rosenblum |
| 2002/0059369 A1 | 5/2002 | Kern |
| 2002/0111907 A1 | 8/2002 | Ling |
| 2002/0168055 A1 | 11/2002 | Crockett |
| 2003/0009392 A1 | 1/2003 | Perkowski |
| 2004/0022523 A1 | 2/2004 | Duerr |
| 2004/0049702 A1 | 3/2004 | Subramaniam |
| 2004/0153509 A1 | 8/2004 | Alcorn |
| 2004/0186809 A1 | 9/2004 | Schlesinger |
| 2005/0005168 A1 | 1/2005 | Dick |
| 2005/0027796 A1 | 2/2005 | San Andres |
| 2005/0114711 A1 | 5/2005 | Hesselink |
| 2005/0120233 A1 | 6/2005 | Halcrow |
| 2005/0136949 A1 | 6/2005 | Barnes |
| 2005/0149481 A1 | 7/2005 | Hesselink |
| 2005/0248444 A1 | 11/2005 | Joao |
| 2005/0264400 A1 | 12/2005 | Fisher |
| 2006/0053097 A1 | 3/2006 | Kinq |
| 2006/0136726 A1 | 6/2006 | Ragnet |
| 2006/0282408 A1 | 12/2006 | Wisely |
| 2007/0112622 A1 | 5/2007 | Meggs |
| 2007/0118426 A1 | 5/2007 | Barnes |
| 2007/0173266 A1 | 7/2007 | Barnes |
| 2007/0239716 A1 | 10/2007 | Weininger |
| 2007/0271830 A1 | 11/2007 | Holt |
| 2008/0046723 A1 | 2/2008 | Weber |
| 2008/0114739 A1 | 5/2008 | Hayes |
| 2008/0148193 A1 | 6/2008 | Moetteli |
| 2008/0178271 A1 | 7/2008 | Gajjala |
| 2008/0178272 A1 | 7/2008 | Gajjala |
| 2008/0189763 A1 | 8/2008 | Smith |
| 2008/0215424 A1 | 9/2008 | Guldimann |
| 2009/0006860 A1 | 1/2009 | Ross |
| 2009/0031006 A1 | 1/2009 | Johnson |
| 2009/0064557 A1 | 3/2009 | Hughes |
| 2009/0089423 A1 | 4/2009 | Seki |
| 2009/0144624 A1 | 6/2009 | Barnes |
| 2009/0222897 A1 | 9/2009 | Carow |
| 2009/0248837 A1 | 10/2009 | Pantoja |
| 2009/0320035 A1 | 12/2009 | Ahlgren |
| 2009/0320107 A1 | 12/2009 | Corella |
| 2011/0156914 A1 | 6/2011 | Sheharri |

* cited by examiner

FIG. 4

SYSTEMS AND METHODS FOR MANAGING DISCLOSURE OF PROTECTABLE INFORMATION

CROSS-REFERENCE TO RELATED APPLICATION

This application is a continuation of and claims priority from pending U.S. patent application Ser. No. 13/801,752 to Smith filed Mar. 13, 2013, which is a continuation of U.S. patent application Ser. No. 12/340,963 to Smith filed Dec. 22, 2008, now U.S. Pat. No. 9,003,474, which claims the benefit of U.S. Provisional Patent Application No. 61/091,267, to Smith filed Aug. 22, 2008, all applications herein incorporated by reference.

FIELD OF THE INVENTION

Embodiments of the present invention relate to information retrieval systems that disclose protectable information.

BACKGROUND OF THE INVENTION

In a conventional information storage and retrieval system, users present to the system requests for search. If the system determines via an index that a document matches the search criteria, access to the document is provided to the user who requested the search. Generally, documents that contain confidential information are not made available for access in this manner, unless all users and potentially the entire network are under the administration of a single authority that can bind the users to secrecy by contract. For example, all employees using an intranet hosted by an employer may search the employer's confidential information protected from disclosure by employment agreements.

Searches that disclose confidential information via public networks have been suggested with the limitation that the search criteria and the indexes are consistently encrypted.

Storage and retrieval systems that span a public network have also been suggested where access is limited to subscribers. Subscribers are trusted with disclosures of confidential information because they have agreed to the terms of a subscription agreement related to the services provided by an authority managing the system.

These technologies, however, do not economically offer sufficient flexibility and protection to facilitate greater cooperation between agencies and agents.

BRIEF DESCRIPTION OF THE DRAWING

Embodiments of the present invention will be described with reference to the drawing, wherein like designations denote like elements, and.

DETAILED DESCRIPTION OF PREFERRED EMBODIMENTS

Most organizations and associations that value the information collected by their employees or members while on the pursuit of their corporate mission will at some point refuse to permit non-employees or non-members access to that information without a fair trade of value. The value may be material (e.g., monetary) or abstract (e.g., risk reduction, market advantage, charitable). When the value is perceived to be high, the organization may adopt a policy to protect all such information and consequently not disclose any of such information. The information itself may have value due to not being widely known, its organization, its accuracy, its origin, and/or its authenticity. Organizations and associations, therefore, generally strongly restrict the disclosure of such information even to the detriment of a common benefit that might result among noncompeting organizations and associations that have compatible missions. All such organizations and associations are herein called agencies; and their employees or members are herein called agents, who may also be referred to as users or administrators. An administrator of an agency acts as an authority for the agency. Such information is herein called protectable information because access controls provide some protection, regardless of whether any form of legal protection exists or could exist.

One of the purposes of systems and methods of the present invention is to support limited disclosure of protectable information. Such support may avoid undue compromise of the value of the information. Such support may avoid disclosures without a fair trade of value. Disclosures, according to various aspects of the present invention, may include human-authorized disclosures.

According to various aspects of the present invention, some disclosures, herein called human-authorized disclosures, include those disclosures that are not made without the involvement of at least one human who makes a decision to disclose based generally on the merits of a request to disclose. Other decisions preceding human involvement and/or following human involvement (e.g., implementing a scope of disclosure for a particular human-authorization) may be made automatically via computer decision making technologies. The human-authorization may be on a case by case basis or on a group of cases having something in common (e.g., all related to one project of the requesting agency). A decision on the merits includes a decision informed by considerations of trust between the discloser and the recipient of protectable information. A requester may present itself as trustworthy. A human administrator of a source of protectable information may overtly or covertly obtain assurances that the requester is correctly identified and sufficiently trustworthy (e.g., registrant has made no misrepresentations). Existence of bias and ulterior motive may be considered for human-authorized disclosures.

According to various aspects of the present invention, computer decision making technologies may be augmented by human-authorization. Human-authorized disclosures may be made in conjunction with computer automated decision making. Additional disclosures (e.g., concurrent with an initial disclosure, at times following the initial disclosure) may be made by automatic decision making technologies after a prototype decision is made by human-authorization (e.g., defined by a scope of a permit). Additional information may be of the same type as the prototype. Additional information may be related to the prototype (e.g., further results from the same source, related by subject matter, related by socioeconomic indicators, related by pathogenic link, related by forensics, related by suspected modus operandi) as determined for example by the person who authorized the initial disclosure (e.g., a registered administrator of a source agency).

Generally, practice of the inventions discussed herein result in socially desirable, improved cooperation between agencies. Such cooperation may be improved by satisfying a providing agency's need for a basis for trust, facilitating human authorization as to how much is disclosed, facilitating human-authorization as to who to disclose to, and/or facilitating human authorization as to how long the access will be available. Systems and methods of the present invention provide one or more of these improvements. Improved communication is more likely to have a positive effect for missions of social importance (e.g., law enforcement, public safety, medicine, education, entertainment, agriculture, managing natural resources, construction, manufacturing, transportation, charity), where such missions are believed by many to be important as evidenced by the very existence of several agencies with similar missions.

A request for information (e.g., a request for search), according to various aspects of the present invention, may be made to an unknown audience of possible sources of protectable information. Each possible source may remain unknown to the requester during some or all of that source's evaluation process. By shielding the identity of a source, requesters have no incentive to speculate or to make requests for illegitimate purposes. If a human-authorized decision to disclose is made by a source of information, for example a source agency's administrator, a requester's agency's administrator may proceed with its own human-authorized and/or automated evaluation of whether to become a recipient in light of any risk of liability it may attach to receiving and controlling further potential disclosure of the protectable information.

A system for managing protectable information, according to various aspects of the present invention, may be part of a site. Methods for managing protectable information, according to various aspects of the present invention, are performed by one or more servers of a computer system that hosts that site. One or more sites may be hosted in full or in part by a computer system. The computer system may include one or more servers coupled by public and/or private networks to cooperate for performing the services needed to host the site or sites. A site may have one or more portals by which other computer systems (e.g., users operating browsers, agencies operating crawlers) interact with the site. A portal may include one or more network addresses, protocols, and services for such interaction. The servers of a computer system may be co-located or geographically distributed (e.g., for managing traffic and/or reliability). A site may be hosted by one server. Where several servers are used to host a site, the services of the site may be divided among the servers to permit economical management of the services. For example, services related to a set of particular types of transactions may be performed by a specialized server or group of servers dedicated to that set of particular types of transactions. That specialized server or group of servers may be managed by an entity that offers such specialized services as part of many sites. Consequently, one entity or several entities (e.g., providers of specialized services) may manage the servers that constitute a system for managing protectable information.

A service may be implemented by one or more processes where each process is performed by a server. All processes of a service may be performed by one server. Where multiple servers are used to perform a service, each server may perform a copy of a process or processes (e.g., parallel processing); and/or processing may be accomplished in series (e.g., pre-processing, processing, post-processing) with each part performed by a different server. Consequently, services discussed herein for practice of the present invention may communicate among each other using any conventional forms of interprocess communication that may involve communicating via a common memory, synchronized memories, a common information store, synchronized information stores, and/or message sending and receiving via any medium (e.g., through an operating system, across one or more physical network links, across one or more virtual network links). Consequently, as used herein, information is "sent" when a so-called sending process allows a so-called receiving process read access to the information in a manner suited to an interprocess communication technology; and information is "received" when the receiving process reads information sent by a sending process. The information may be unformatted (e.g., a value, an entry point, a process handle) or may be formatted for reliable communication according to the interprocess communication technology (e.g., constitute a parameter, a message, a request, a reply, a broadcast).

A site may include content (e.g., arranged as a collection of pages and downloadable documents), a capability to host the content by storing, accessing, and delivering that content, and a capability to communicate with browsers and/or servers. A document may contain text, graphics, audio, and/or video information in any conventional format. The content may be hosted by one server, or distributed among a network of servers in any conventional manner. The storing, accessing, delivery, and communicating functions may be combined on one server or distributed among a network of any number of servers (e.g., co-located or geographically separated). Subscribing may include registering and agreeing to pay a subscription fee for use of the site.

Figure 1:
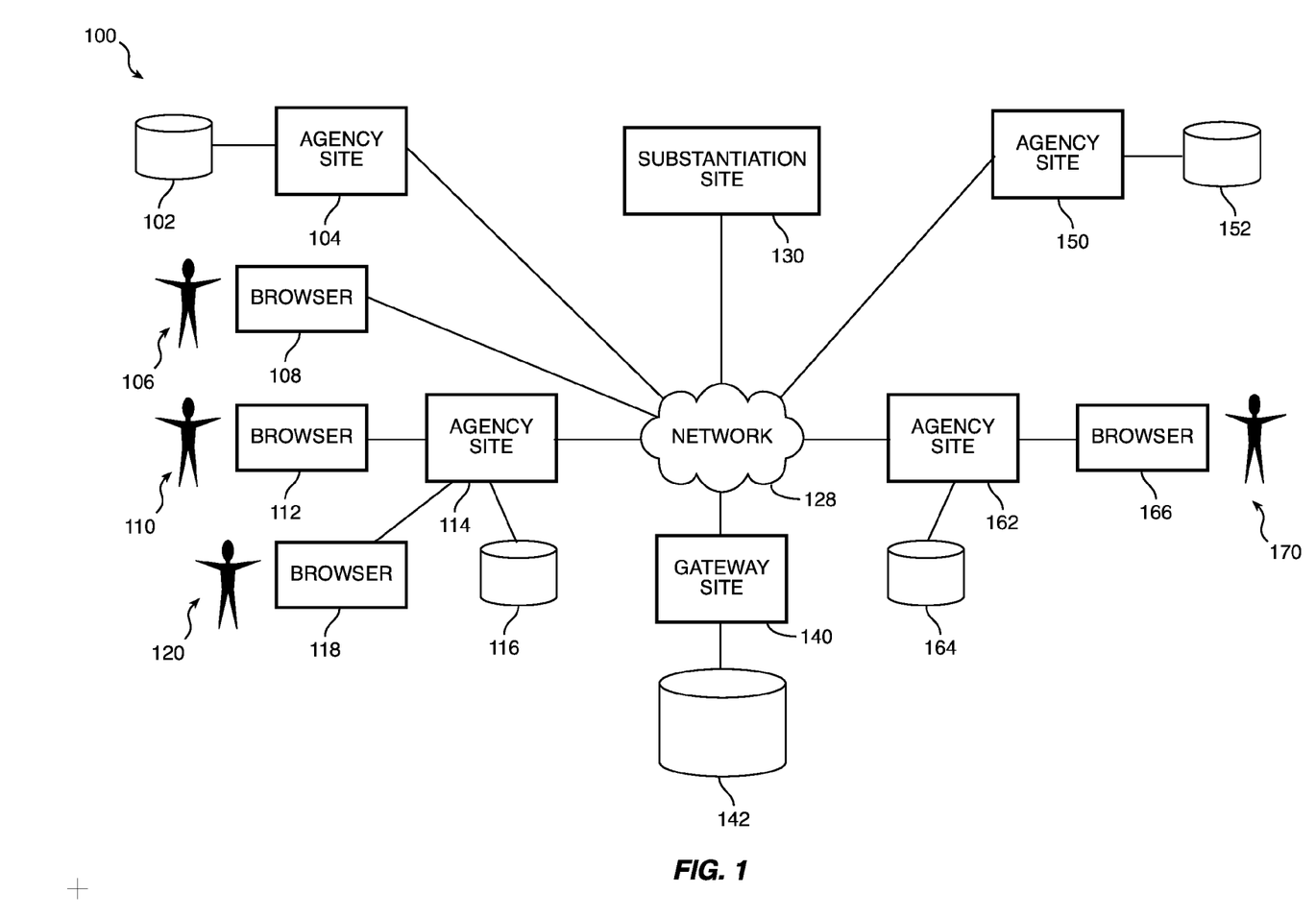
FIG. 1 is a functional block diagram of a system according to various aspects of the present invention.
Figure 2:
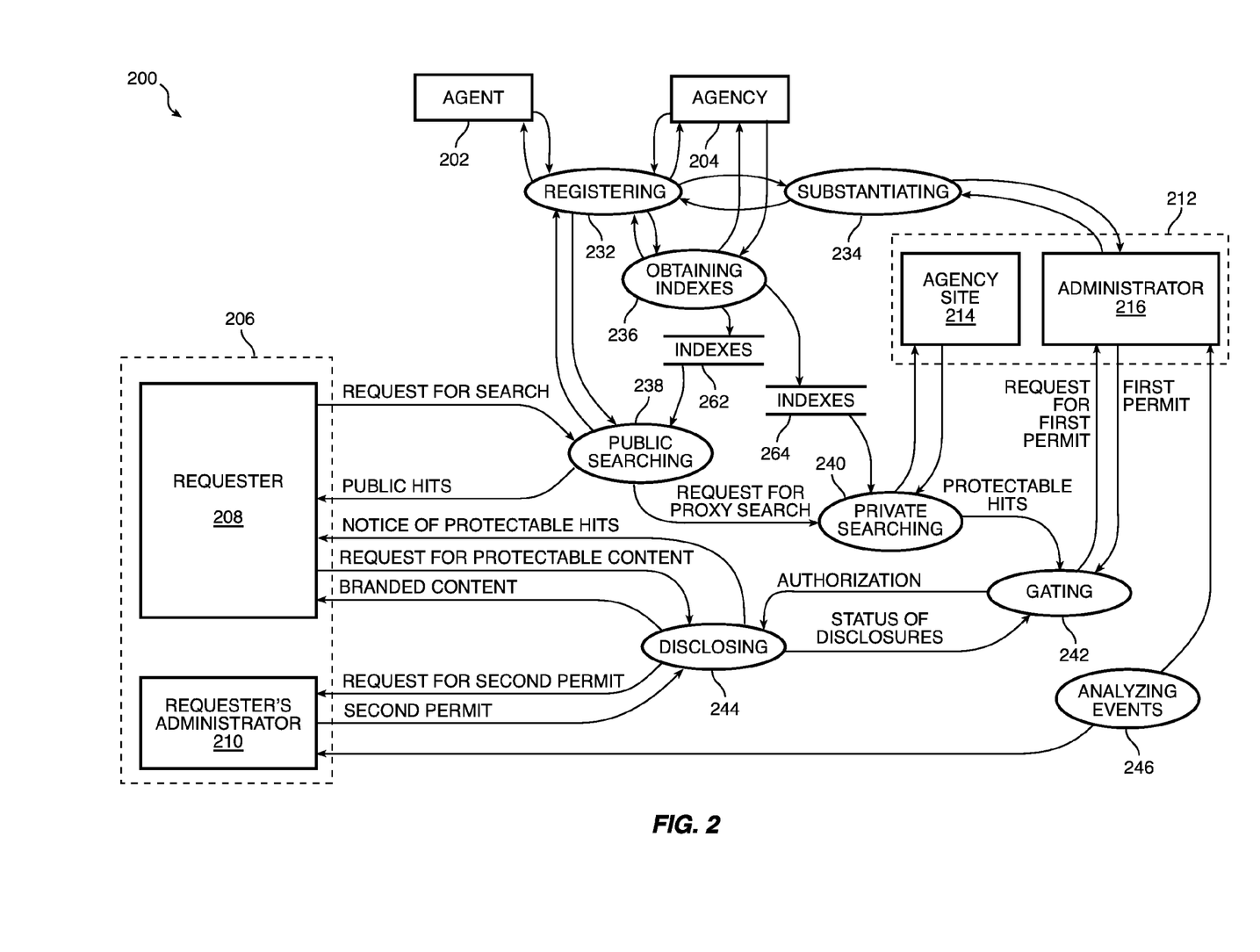
FIG. 2 is a dataflow diagram for services performed at a gateway site of the system of FIG. 1.
Figure 3:
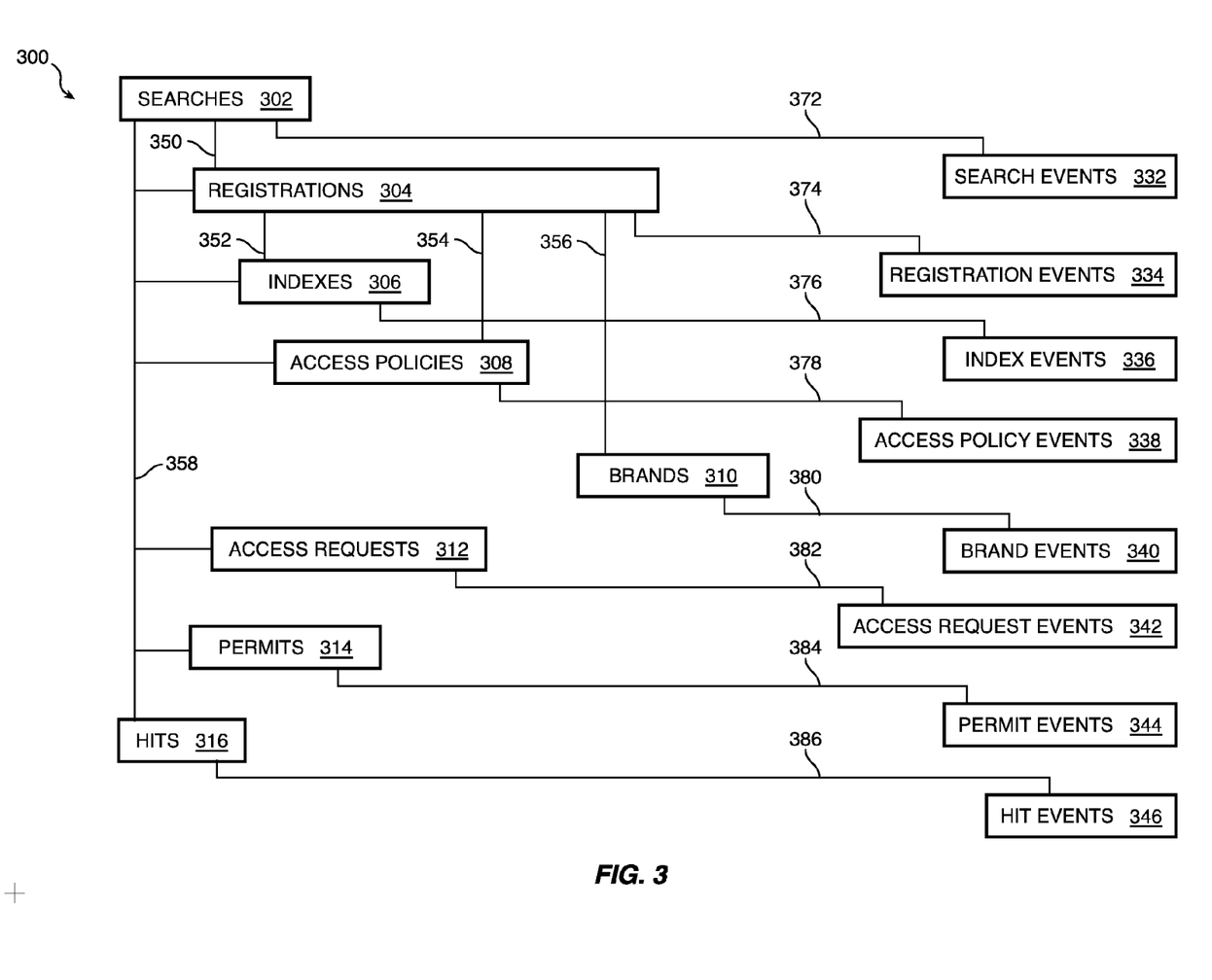
FIG. 3 is an entity relationship diagram for a database used by the gateway site of FIG. 1.

For example, system 100 of FIGS. 1-3 illustrates various examples of systems for managing protectable information as discussed above. System 100 supports communication in several scenarios among agents and agencies. These scenarios provide a convenient way to identify and explain the services, processes, functions, cooperations, and data structures that may be arranged as an implementation of a system or method according to the present invention. System 100 illustrates a model from which implementations of systems and methods according to various aspects of the present invention may be built.

Risks of unintended disclosure of protectable information may be outweighed in one or more scenarios discussed below. According to various aspects of the present invention, a basis for trust is established before disclosure, a basis for trust may be established, verified, and/or expanded after a request for particular protectable information is received, permission to disclose may include a human-authorization by an administrator of an agency, and/or willingness to accept protectable information may be subject to a human-authorization by an administrator of an agency. These functions may be realized by three types of requesters interacting with two types of sources of protectable information. According to various aspects of the present invention, a gateway site may identify and cooperate accordingly with each type of requester and each type of source. To accomplish the functions discussed above with respect to managing disclosure of protectable information, methods for communicating with each type of requester and each type of source are described below.

For an example implementation depicted in FIG. 1, one of each of three types of requesters is shown: an unsupervised agency site (102, 104); an unsupervised browser (108); and a supervised agency site (112-118). In various implementations, zero or more of each of these types of requesters may cooperate with gateway site 140. One of each of two types of sources of protectable information is shown: an unsupervised source site (150, 152); and a supervised source site (162-166). In various implementations, zero or more of each of these types of sources may cooperate with gateway site 140.

System 100 includes an information store 102 coupled to an agency site 104, a browser 108 for an agent 106, a browser 112 for agent 110, a browser 118 for administrator 120, information store 116, agency site 114 coupled to browsers 112 and 118 and to store 116, substantiation site 130, gateway site 140, information store 142 coupled to gateway site 140, agency site 150, information store 152 coupled to agency site 150, agency site 162, information store 164 coupled to site 162, browser 166 coupled to site 162 for administrator 170, and network 128 providing communication links to browser 108 and sites 104, 114, 130, 140, 150, and 162.

Each site of system 100 is hosted on one or more servers as discussed above. A server includes any conventional computer having software and hardware for processing, memory (e.g., semiconductor, optical, magnetic), and peripherals (e.g., a user interface). Memory and/or peripherals may include an information store as discussed herein. A server generally has hardware and software for managing communication and data manipulation in relatively high volume. A server is generally operated by technicians, as opposed to the requesters and administrators discussed herein. The functions performed by a server may be implemented in any conventional computer technologies and are not limited by physical and political boundaries. Generally, servers have redundant hardware and processing capabilities to address the relatively high volume of communication and data manipulation. A server may support interaction over a network with browsers and with agency sites via conventional data communication.

A browser (e.g., a personal computer, a network appliance similar to a server) includes any conventional computer having software and hardware for processing, memory, peripherals, and a user interface for communicating over a network. A browser generally has hardware and software for managing communication and data manipulation in relatively lower volume than a server. A browser is generally operated by one user, typically an agent of an agency, and for a role herein described as a requester or administrator. A person may serve as an agent for more than one role; and/or in relatively unusual circumstances serve as an agent of more than one agency.

For example, browser 108 performs a conventional browsing process permitting user 106 to request use of gateway site 140. Use may require prior registration of user 106 and registration of an agency to which user 106 is an agent. Registration may be accomplished via the browsing process of browser 108 in cooperation with gateway site 140 and/or substantiation site 130. Protectable information, if any, may be delivered to browser 108 for display to user 106. Browser 108 may store protectable information subject to controls by user 106 and/or software performed by browser 108. Browser 112 is operated by user 110 through agency site 114. Storage and control of protectable information may be subject to control by administrator 120 operating browser 118 of agency site 114 and/or software performed by agency site 114. Protectable information, if any, may be delivered to agency site 114 for storage on information store 116 to avoid storing protectable information on browsers 112 and 118. Browser 166 is operated by administrator 170 to process requests for access and permits for use by gateway site 140.

A user may subscribe to a gateway site via a network. Registering may include providing credentials of identity and credentials to meet qualifications set by the administrator of the gateway site.

A network provides signal communication via links between sites and browsers. Signals may be analog or digital. A network may have a topology that corresponds to a local area network, a wide area network, a wireless network, and combinations of these types of networks. For example, network 128 includes the conventional technologies of the Internet. Conventional forms of encryption may be used for messages communicated via network 128. The seven links with network 128 in system 100 may be implemented with any secure network technologies.

An information store includes any subsystem for information storage and retrieval. Information may include instructions for the performance of methods taught herein. Information may be organized for storage and/or access using any conventional database technology. Information may include data such as text, graphics, audio, and/or video in any conventional formats and combinations. Data may include metadata such as tags for conventional markup languages. Information may include data structures also called records or tagged markup that implement an association between fields of information in the record or tagged markup. Records may be indexed on any suitable fields called keys. A list of records is often called a table, particularly where one key field is associated with one or more non-key fields. Indexes may be combined in cross-reference lists to accomplish one-to-one, one-to-many, many-to-one, and many-to-many associations. A hybrid list of records may include key fields and non-key fields and function as one or more of an index, a cross-reference list, and/or a table.

For example, information stores 102 and 116 may include instructions and data for respective agency sites 104 and 114 to perform the functions of an agency site as to protectable information received from other agency sites and gateway site 140. Information stores 102 and 116 may include instructions and data for respective agency sites 104 and 114 to automatically output requests for search used by gateway site 140. Store 116 may include instructions and data for outputting permits used by gateway site 140. Information stores 152 and 164 include protectable information, instructions, and data for respective agency sites 150 and 162 to perform the functions of an agency site as to that protectable information. Information store 142 includes instructions and data for gateway site 140 to perform the functions of a gateway site, inter alia, as to requests for search received from network 128 and as to protectable information sourced by agency sites 150 and 162. Information store 142 may include instructions and data for completing the registration of agents and agencies. Information store 142 may include indexes received from agency sites 150 and 162 to facilitate searching of protectable information by gateway site 140.

An agency site may request access and/or govern access to protectable information. The protectable information may be part of an information store of the agency site (e.g., the origin or sole authority of that information). An agency site may include a firewall between a public network or less secure network (e.g., the Internet) and a private network (e.g. an intranet). An agency site may support a community of users (e.g., agents) via an intranet and browsers. Generally, an agency has political and/or physical control over its agency site, an information store coupled to the agency site, an intranet serving browsers from the agency site, and browsers coupled to the intranet. An agency site may include software for producing automated requests for search and/or automated permits as discussed herein.

For example in system 100, agency sites 104 and 114 represent servers managed by agencies who request the protectable information of other agencies. Agency sites 104 and 114 may be managed according to industry recognized standard practices to qualify for agency registration with gateway site 140. Such registration may be prerequisite to use of gateway site 140 by the agency site and/or by agents of that agency. Continuing the example of system 100, agency sites 150 and 162 represent sources of protectable information that may be disclosed after, among other things, being identified in a hit by gateway site 140.

A substantiation site has software and communication technologies for verifying the accuracy of information presented to it for verification. Results of substantiation may include information gathered from records from financial, business, labor, social, and government institutions such as public records, employment records, tax returns, credit reports, medical records, and research reports. When results of substantiation corroborate information provided by an agency or an agent, the fact of corroboration and/or the specifics of the corroboration may be used for qualification for registration and/or further assurances of trustworthiness. For example, substantiation site 130 respectively replies to requests for substantiation it may receive from gateway site 140 and agency sites 150 and 162. Substantiation site 130 may perform all or part of the registration process for agents and agencies, reporting results of registration to gateway site 140.

A gateway site may include a set of services for managing protectable information. These services may be implemented with servers, processes, and interprocess communication as discussed above. For example, gateway site 140 may include portals and services for operation on the World Wide Web of the Internet. Gateway site 140 may present to browser 108 and 112 one or more web pages for registering, searching, and disclosing of protectable information. Gateway site 140 may communicate with agency sites 104 and 114 in any conventional manner for registering, searching, and disclosing of protectable information. Gateway site 140 may use search indexes on store 142 to respond to requests for search received from agency site 104, browser 108, and agency site 114. Hits may include URLs of protectable information on agency sites 150 and 162. Gateway site 140 may communicate with agency sites 150 and 162 in any conventional manner for registration, obtaining indexes, and performing proxy searches. Gateway site 140 may communicate with agency sites 150, 162, and 114 in any conventional manner for outputting requests for access, and receiving permits.

For each hit (if any) identifying protectable information, gateway site 140 may prepare and send a request for access (e.g., implemented with a request for first permit and/or a request for second permit) to the administrator of the agency managing the source of the protectable information. The request for access may include a date-time of request, identify the requester, and identify the type of requester with information based on the requester's registration information. For example, contact information for the administrator may be derived from the URL of the hit with reference to registration information for agencies. A FAX, an email, an instant message, a conventional text message over a cell phone network (e.g., SMS), and/or an automated voice message over a phone network may be used. Gateway site 140 may track and close requests for access if no response is received within a suitable limit duration of time (e.g., about 1 hour to about 72 hours). Consequently, the requester has no knowledge that a search of protectable information was attempted or completed; and has no knowledge of any hits of protectable information, unless a request for access results in permit(s) being received and processed (discussed below) before the corresponding request for access is closed.

A requester may be an unsupervised agent such as user 106 operating browser 108. Gateway site 140 may follow the method discussed above with reference to the requester being an unsupervised agency site, except that the request for access is formed to identify this requester as a different type of requester, namely an unsupervised agent.

A requester may be an agent working through his or her supervised agency site such as agent 110 operating browser 112 through agency site 114. Gateway site 140 may follow the method discussed above with reference to the requester being an unsupervised agency site, except that the request for access is formed to identify this requester as a different type of requester, namely an agent working through his or her supervised agency site. Agency site 114 is supervised by administrator 120 operating browser 118 of agency site 114. As discussed below, control over the receipt of protectable information and control over disclosure of the same to agent 110 and possibly other agents of the same agency may be subject to a human-authorization.

An unsupervised agency site may be a source of protectable information such as agency site 150 and information store 152. Gateway site 140, with reference to registration information, may determine that the URL of a hit corresponds to an unsupervised agency site. Agency site 150 may implement an automatic process for receiving requests for access and outputting suitable permits received by gateway site 140. The criteria for outputting a permit and the scope of the permit may be determined without interaction with gateway site 140.

In another implementation, formation of a request for access in some cases may be omitted from the methods discussed above for the three types of requesters. Instead, permission for access may be determined by gateway site 140. Gateway site 140 may impose one or more additional limitations on access according to agreements with the agency corresponding to agency site 150. For example, such agency may reflect in its registration information that server 140 must deny access when requested by one or more types of requesters, during designated date-time periods, and/or unless substantiation of the requester's registration information (or further substantiated information) is accomplished as a prerequisite to permitting access. In the latter case, gateway site 140 may form a request for substantiation, send it to substantiation site 130, track reply, and permit access only if a suitable reply is received from substantiation site 130 before the request for substantiation is closed by lapse of a suitable duration of time (e.g. about 1 hour to about 72 hours).

A supervised agency site may be a source of protectable information such as agency site 162 and information store 164. Administrator 170 in any suitable manner may receive the request for access prepared by server 140, as discussed above. Administrator 170 operating browser 166 may cooperate with agency site 162 to complete an evaluation of the request for access and the merits of disclosure of protectable information. Agency site 162 may then form a suitable permit and send the permit to gateway site 140. Administrator 170 may, through agency site 162 or otherwise, obtain further assurances of trustworthiness of the requester, contact the requester 106 or 120 for additional information (e.g., purpose of the request, other requests that together support the same project or purpose), and/or contact an administrator 120 of the agency of agent 110. A FAX, an email, an instant message, a conventional text message over a cell phone network (e.g., SMS), automated voice message over a phone network, personal visit, or phone conversation, may be used. A permit may include indicia of authorization by the source agency's administrator (e.g., an electronic signature).

When gateway site 140 receives a suitable permit as discussed above, gateway site 140 may form a reference to the URL of the hit comprising the URL of the hit and a token. The token may include an arbitrary URL (e.g., a URL of a copy of the protectable information transferred from information store 152 or 164 to information store 142). The token may be sent to the requester in the case of an unsupervised agency site (104) or an unsupervised agent (106). If the requester is a supervised agent (110) operating through an agency site (114), then the token may be sent to the administrator (120) of the agency site. Any suitable form of communication may be used. For example, a FAX, an email, an instant message, a conventional text message over a cell phone network (e.g., SMS), an automated voice message over a phone network, a personal visit, or a phone conversation may be used.

A requester in receipt of a token may present the token to the gateway site 140 in the same session or a new session after credentials of registration have been accepted by the gateway site 140. In response to receiving a token, gateway site 140 may refer to the reference to determine the URL of the protectable information. If the reference does not exist, gateway site 140 may issue an error message (e.g., to avoid confusion from typing or transmission error); or take no action. This URL may identify information on information store 150 or information store 164; or this URL may identify information that has been copied from such a source to information store 142. Gateway site 140 may also verify that any limitations on disclosure that may have been set by agreement with the source agency are met. For example, an expiration date-time may be determined from information associated with the reference. In such case, the reference may be used as discussed above if the reference has not expired. Use of a reference or of an expired reference may be reported by gateway site 140 to the requester (104, 106, 110), a supervisor of the requester (120), the source agency (150, 162), or a supervisor of the source agency (170).

A query presented by the user to a gateway site may be replied to with public hits (e.g., URLs to public content) herein called a primary search. The gateway site may also act on the query as a secondary search (also called a proxy search) without notice to the user. The secondary search may be presented to agencies that have subscribed to the gateway site. Subscription by an agency may include transfer of one or more indexes to the gateway site for the purpose of conducting a search of protectable information locally. The agency may maintain on an agency site the indexes and/or the search engines for the secondary search. If the results from the secondary search include at least one hit, the results may be sent to the gateway site. The gateway site then may send a request for access to an administrator of the agency site. If the administrator issues a permit, sent to the gateway site, then the gateway site may notify the user that protectable information is available. The actual URL of the secondary hit may be obscured to the user by the gateway site. For example, the user may receive from the gateway site an email with a link in it. Following the link may activate a proxy search by the gateway site. The proxy search may provide one or more permitted URLs. The content at a permitted URL may be passed through the gateway site to the user. Links (if any) in the content may be disabled by a service of the gateway site. Indicia of the identity of the agency and information leading to the agency site may be obscured.

A system for managing protectable information, in a first example, includes one or more servers that perform a private searching service. Another system for managing protectable information, in a second example, further includes a gating service. Another system for managing protectable information, in a third example, further includes a disclosing service. Another system for managing protectable information, in a fourth example, further includes an analyzing events service. Another system for managing protectable information, in a fifth example, further includes a public searching service. Another system for managing protectable information, in a sixth example, further includes a registering service. Any system for managing protectable information in the foregoing examples may further be part of a site. The site may include any number of portals for access by agents and/or agencies. A system for managing protectable information that is not part of a site may include hardware and software for supporting interprocess communication as needed for the services being performed (e.g., for secure communication with browsers).

For example, set of services 200 of FIG. 2 includes registering service 232, substantiating service 234, obtaining-indexes service 236, public-searching service 238, private-searching service 240, gating service 242, disclosing service 244, and analyzing-event service 246. Each service may perform its functions whenever sufficient inputs are available. According to various aspects of the present invention, a system for managing protectable information operated by a particular entity may include one or more servers that perform one or more of the services of set 200. Other entities may manage servers for performing services (e.g., of set 200) that cooperate with such a system for managing protectable information.

In one implementation of system 100, gateway site 140 includes a site with portals for access by agents and agencies. Gateway site 140 includes all services of set 200.

In another implementation of system 100, gateway site 140 includes a site with portals for access by agents and agencies. Gateway site 140 includes all services of set 200 except substantiating service 234. Substantiation site 130 includes a site with portals for access by gateway site 140 and agency sites 150 and 162. Substantiation site 130 further includes substantiating service 234. The services of set 200 will be discussed for convenience with reference to this implementation of system 100.

In FIG. 2, the requester's agency 206 is responsible for the actions of its employees including requester 208 and requester's administrator 210 consistent with the mission and policies of agency 206. When requester 208 represents an unsupervised requester (102-104 automated; or 106-108 human), administrator 210 is omitted. When requester 208 represents a human supervised requester (110-116), requester's human administrator 210 corresponds to administrator 120-118. Agency 212 is responsible for maintaining protectable information on agency site 214 consistent with its mission and policies. When agency 212 represents an unsupervised source (e.g., 150-152), human administrator 216 may be omitted. When the source is supervised by a human administrator, agency 212 includes a human administrator 216, 170, and browser 166.

A registering service obtains credentials used later by a gateway site to begin a unique session with each requester and perhaps other servers. The requester (e.g., via a browser or agency site) is presumed to be able to supply credentials during a logon process hosted by a gateway site. Any conventional credentials may be provided for successful registration (e.g., username, passphrase, CAPTCHA). A gateway site may refuse to communicate with an unregistered requester or an unregistered site seeking to present a request for search. Credentials may include information that forms a basis for identification and trust with protectable information. Basis for trust may include certification that the agency has met and continues to meet conventional criteria for high quality control of confidential information. Certification may be subject to verification, for example, by a substantiating service. Certification may be made for registration of an agency or for registration of an agent.

For example, registering service 232 hosted at gateway site 140 may solicit registration or await agent/agency initiated registration. Solicitation may include email offers to register that provide a hyperlink acted on by registering service 232. To obtain credentials, registering service 232 may conduct a dialog with agent 202 representing any agent (e.g., 106, 110, 120, 170) or a dialog with agency 204 (e.g., an agent or source of information regarding the agency) representing any agency site (104, 114, 150, 162). The dialog may present a blank form web page to be filled in by the agent or agency site. The form may collect information describing an agent or an agency that is later verified. The filled form may constitute a request for registration.

Registering service 232 may request verification by requesting particular data to be verified by substantiating service 234 and then collect further information from replies made by substantiating service 234. Registering service 232 may prepare and post a complete record of the type described below with reference to Table 2 with a suitable status. Registration process 232 determines if the replies meet subscriber qualifications and if so enters a subscription or registration for agent 202 or agency 206 to use gateway site 140.

A dialog between registering service 232 and an agency 204 may provide registering service 232 with information describing indexes sufficient to prepare and post one or more complete records of the type described below with reference to Table 3.

Registering service 232 may use the status field of a registration record for managing a workflow in any conventional manner to reach a disposition for each agent and agency that attempts registration. Changes in status may give rise to a suitable event record of the type described below with reference to registration-events table 332.

Registering service 232 responds to requests for verified information describing agents, agencies, and indexes. Such requests may originate from an obtaining-indexes service and/or a public-searching service described below. In system 100, agents 106, 110, 120, and 170 and agency sites 104, 114, 130, 150, and 162 have met all qualifications for registration and logon dialogs unless otherwise clear from the context.

A substantiating service, in response to receiving information to verify, obtains further information that may substantiate or corroborate the received information. Information may be obtained from public sites and/or agency sites (e.g., employment information for agents, business organization information for agencies). To avoid the possibility of bias, a substantiating service may be performed by a substantiating server operated by an entity different from the entity that operates gateway site 140. Sources of information accessed by a substantiating service may include public information and/or protectable information collected for example by a labor union, an association of agencies, a government, a credit bureau, an insurance company, or an industry specific organization. For example, substantiating service 234 performed by substantiation site 130 may receive from registering service 232 requests to verify given information and/or receive from administrator 216 requests to verify given information. Substantiating service 234 may then seek and obtain one or more records from one or more sources having duplicate and/or related information, compare the given information with the obtained information, and respond to the requesting service 232 or administrator 216 with a result of the comparison. In the case of obtaining protectable information, substantiating service 234 may provide the related information to a registering service 232 for further automated or human analysis. In the case of obtaining protectable information, substantiating service 234 may avoid providing the related information to an administrator 216 to avoid inappropriate disclosure of protectable information.

Access to a substantiation site may be by subscription. For example, gateway site 140 may register with substantiation site 130 and for each access thereafter present credentials for logon. Data being substantiated may be nonpublic information. For example, the name of an employer of an agent 202 may be verified as a type of employer for which collaboration with agency 212 of agency site 214 is suitable. Current employment, training, and level of authority may be verified.

The exemplary dialog for verification between registering service 232 and substantiating service 234 discussed above may be repeated for several substantiation sites for the same information, or repeated for one or more substantiation sites for each type of information provided in the request for registration.

An obtaining-indexes service obtains up to date search indexes to be used by public and/or private searching services. A search index may be prepared by conventional web crawlers and data mining technologies. Indexes may be complete or sparse. A sparse index may assure that a complete copy of the indexed content (e.g., document) cannot be derived from analysis of the index. A sparse index may omit some content or omit some types of content at an agency site. A search index may comprise records each having a term and a uniform resource locator (URL). A term may include any information (e.g., text, metadata, summary or analysis, standardized descriptors, graphics, audio, video) suitable for determining inclusion or exclusion from search results based on search criteria. An index may further include information for quickly locating the term in the content. A search index may be encrypted using known technologies.

A request to perform a search (e.g., a request for search) may include various formulations of search criteria (also called a query). Search criteria may include samples of text, graphics, audio, and/or video. Samples may be used explicitly or as the basis for abstractions or generalizations to improve the usefulness of the search results. Abstractions and generalizations include syntax (e.g., text wild card characters), boolean logic, regular expressions, and conventional criteria for sophisticated matching (e.g., searching fingerprints, face recognition, speech recognition, geography and locale recognition).

When a term of a search index meets the search criteria, the information for accessing (e.g., URL, token) that was associated to the term by the search index is called a hit. A hit may facilitate access to content desired by the requester. A hit may include a URL. Notice of a hit may include a hyperlink and a description of the content. The hyperlink may identify a URL for access to the content. A term of a search may be encrypted using a suitable conventional technology (e.g., public key) for searching each encrypted index. Searching of indexes may be accomplished using known technologies for clear and encrypted terms and indexes.

Consequently, a request for search may comprise a request for a list of hyperlinks that meet the search criteria. A searching service may post a record describing the requested search to a database, for example, as described below with reference to Table 1.

In response to registration of an agency, an obtaining-indexes service may request and obtain from the registered agency indexes for searching protectable information held by that agency. For example, obtaining-indexes service 236 becomes aware of the registration of agency 204 by any conventional technology (e.g., push, pull, poll, batch update). In accordance with information provided by agency 204 during its registration, obtaining-indexes process 236 requests a copy of particular indexes identifying the source of protectable information (e.g., documents, other content) from a site (e.g., 150, 162) associated with agency 204. The information provided during registration may identify each index as public or private. Obtaining-indexes service 236 stores indexes to public information in store 262 and indexes to protectable information in store 264. Stores 262 and 264 may be part of information store 142. In particular, agency 204 may operate agency site 150 that includes a crawler directed to maintaining indexes of protectable information (e.g., private) stored in information store 152. An index produced by the crawler may be stored on information store 152. During registration the URL of such index may be given by agency 204 and stored by registering service 232. Obtaining-indexes service 236 may copy the index from the URL (e.g., from 152) to information store 142.

A public-searching service may include conventional search engine software, and search indexes that locate information to be accessed over a network. A public-searching service receives requests for search; and provides search results that generally include a list of hits identifying public content (e.g., public hits) and further facilitating access to the public content via a browser.

For example, public-searching service 238 performed by gateway site 140 may require successful completion of a prerequisite logon dialog to assure that only registered agents and registered agency sites have access to the gateway site and its services as a requester. Following logon, a requester may present a request for search and receive notice of public hits.

A requester 208 may request a search and a public-searching service of a gateway site may reply with public hits that identify public information. The request for search may include a query, herein called a primary query having criteria for defining the scope of the search as discussed herein. For example, public-searching service 238 of gateway site 140 may cooperate with conventional search services (e.g., www.google.com, www.yahoo.com, www.msn.com, www.aol.com) to obtain public hits that do not include protectable information matching the criteria of a request for search. Public-searching service 238 may in addition or in the alternative have access to indexes 262 of public information and determine if the search criteria of the request for search is sufficient to identify any public hits from index 262.

A public-searching service may initiate a request for proxy search directed to a private-searching service. A public-searching service may condition whether it initiates such a request on the type and/or trustworthiness of the requester. For example, a requester 208 may be an unsupervised agency site such as agency site 104 in cooperation with information store 102. An unsupervised agency site that presents logon credentials may request a search. The request for search may be generated automatically, without human intervention for each search. On receipt of a request for search, public-searching service 238 may determine what type of requester 208 made the request, for example, with reference to registration information that corresponds to the logon credentials. Reference may be made by direct access to registration records as discussed above; or, by request directed to a registration service 232. If the requester 208 can be trusted with protectable information, for example as indicated by an agent registration record and/or an agency registration record (e.g., all agents of a particular agency may be deemed trustworthy), then public-searching service 238 may initiate a request for proxy search and send the request to a private-searching service.

On determining that the request for search originated by an unsupervised agency site, public-searching service 238 may categorically deny a request for search of protectable information or limit the resources of gateway site 140 that are made available to respond to such requests.

A private-searching service provides the results of a search of protectable information. The results may convey to a gating service the identity of the requester and describe the initial request for search (e.g., date-time, primary query). A private-searching service may receive a request for proxy search, initiate a search of protectable information, and produce a list of hits that identify protectable information (e.g., protectable hits) that satisfy the criteria of the request for search. For example, private-searching service 240 receives a request for proxy search from public-searching service 238 that may include identification of the requester 208 and a secondary query. The secondary query may be based on the criteria of the primary query discussed above with a scope directed to sources of protectable information. The sources included in the scope of the secondary query may be determined from commonality of field values (e.g., common industry, common standards of trust, common or overlapping agency missions) among registered agencies 214 and the registered requester 208. The scope may be based on what was requested in the request for registration corresponding to requester 208. Private-searching service 240 may perform (and/or send) a second request for search (acting as a proxy for requester 208) for (and/or to) any or all registered agency sites known to be suitable sources of protectable information. If an agency site 214 has provided an index 264 stored on information server 142, the second request for search is not sent to the agency site 214 to avoid unnecessary network communication and to avoid use of agency site 214.

A private-searching service may search in a conventional manner comparing the criteria of the secondary query to indexes stored on a local information store. For example, private-searching service 240 performed by gateway site 140 may refer to indexes 264 obtained by obtaining-indexes service 236 and stored on information store 142. If indexes 264 are incomplete or out of date, private-searching service 240 may request action by obtaining-indexes service 236. Results of such a search may be provided in a list of protectable hits.

A private-searching service may compare the criteria of the secondary query to one or more indexes stored on other agency sites. For example, using any conventional interprocess communication, private-searching service 240 may request a search be accomplished by each agency site 214 (e.g., agency sites 150 and 162). The agency site may require credentials in a logon dialog to assure the request comes from gateway site 140 and not an imposter. Following successful logon, the agency site may receive the request for search and, using software of a conventional search service at the agency site, access an information store having indexes and documents of protectable information to complete the search. Results of such a search may be provided in a list of protectable hits to private-searching service 240. Private-searching service 240 may gather the results of one or more agency sites and assemble and output a list of protectable hits.

An agency site may expose one or more indexes for use by a private-searching service performed at another site. For example, agency site 214 may suitably manage and log access being made of an index stored on an information store at agency 214 by private-searching service 240 performed by gateway site 140.

A gating service determines whether a disclosure of protectable information is to be attempted to a requester and/or the scope of such disclosure. A gating service may manage a workflow regarding each request for access. A request for access may involve successfully obtaining a first and/or a second permit. An agency may specify in general the workflow for an access request as part of its request for registration. For example, gating service 240, performed by gateway site 140, receives protectable hits from private-searching service 240, prepares respective requests for first permits, conducts a dialog with an administrator 216 of an agency site 214 to complete a workflow for each request for first permit, receives respective first permits, and may produce one or more respective authorizations to a disclosing service 244.

A request for first permit may include identification of requester 208, the type of requester (supervised or unsupervised), the initial request for search (e.g., the query and scope of the search), one or more protectable hits, and information derived from registration records for the requester 208, the requester's administrator 210, and the requester's agency 206. The request for first permit may be sent in any manner to administrator 216 (e.g., email). The request for first permit enables a human administrator to evaluate the merits of any requested disclosure of protectable information. Such an evaluation may include verifying information of the request for first permit and related information. For example, to verify such information administrator 216 may make a request for substantiating to a substantiating service 234 of a substantiation site 130 and review the results of substantiation as discussed above. Administrator 216 may contact requester's administrator 210 in any conventional manner to obtain (or discuss) further information, assurances of trustworthiness, the merits of disclosure, and/or the scope of disclosure.

Administrator 216 may provide a first permit or first notice of denial to gating service 242. A first permit may include a reference to the request for first permit and/or some or all of the contents of the request for first permit. The scope of disclosure permitted by the first permit may be defined by the first permit. The defined scope of disclosure may be less, the same, or more than the scope of disclosure in the request for the first permit. The scope may be less if, in the determination of administrator 216, some protectable information is not suitable to be disclosed to requester 208. The scope may be more than requested if, in the determination of administrator 216, other protectable information (e.g., related documents that are not indexed 264 for private-searching service 240) should be disclosed. In the later case, the URLs for the additional protectable information (or for indexes for additional private-searching services) may be included as part of the first permit.

On receiving of a first permit identifying permitted disclosure, gating service 242 provides an authorization to a disclosing service. The authorization may include any or all of the information used to prepare the request for first permit and may further include any or all of the information of the first permit.

A disclosing service provides to a requester access to protectable information also called protectable content. Access may include one or more hyperlinks to protectable content on an agency site (e.g., URLs of one or more web pages and/or downloadable documents). Access may include one or more tokens in place of the hyperlinks. When the requester is a supervised requester, a disclosing service may, prior to granting access, require a second permit from the requester's administrator. For example, disclosing service 244, performed by gateway site 140, receives an authorization from gating service 242. Based on the authorization, disclosing service 244 may send a request for second permit to administrator 210 because requester 208 is a supervised requester. When requester 208 is an unsupervised requester, the request for second permit and second permit may be omitted.

A request for second permit may include identification of requester 208, the type of requester (supervised or unsupervised), the initial request for search (e.g., the query and scope of the search), one or more protectable hits, the identification of the source agency 212, the source agency site 214, the administrator 216 of the source agency who approved the discloser, the scope of the disclosure as defined in the first permit, and information derived from registration records for the requester 208, the requester's administrator 210, the requester's agency 206, the source agency 212, the source agency site 214, and the source agency's administrator 216. The request for second permit may be sent in any manner to administrator 210 (e.g., email). The request for second permit enables a human administrator to evaluate the merits of any requested disclosure of protectable information from the receiving agency's policies, capabilities, and mission. Such an evaluation may include verifying information of the request for second permit and related information. For example, to verify such information administrator 210 may make a request for substantiating to a substantiating service 234 of a substantiation site 130 and review the results of substantiation as discussed above. Administrator 210 may contact the source agency's administrator 216 in any conventional manner to obtain (or discuss) further information, limits of agency 206, the merits of disclosure, and/or the scope of disclosure. Administrator 210 may provide a second permit or second notice of denial to disclosing service 244. A second permit may include a reference to the request for second permit and/or some or all of the contents of the request for second permit. The scope of disclosure permitted by the second permit may be defined by the second permit. The defined scope of disclosure may be less or the same as the scope of disclosure in the request for the second permit. The scope may be less if, in the determination of administrator 210, some protectable information is not suitable to be managed by agency 206 and/or disclosed to requester 208. A second permit may include indicia of authorization by the requester's agency's administrator (e.g., an electronic signature).

On receiving a second permit, a disclosing service may prepare a notice of protectable hits and send the notice to the requester. On receiving a response to the notice, a disclosing service may provide content including protectable information. The content provided to the requester may include brands (e.g., certificates of authenticity, identity of permits, trademarks, service marks, certification marks, electronic signatures) of any or all of the source agency, the source agency administrator, the source agency site, the gateway site, the registering service, the substantiating service, the substantiation site, and the requester's administrator. By including brands with the content, some of the qualities of the content (accuracy, authenticity, completeness, origin) are readily recognized for review and/or for processing (e.g., access restrictions, specialized backup and retention, purging).

For example, disclosing service 244 may prepare a notice of protectable hits that obscures the source agency, the source agency site, and the URL of the protectable hit from requester 208. The notice may facilitate access but provide one or more arbitrary tokens in place of this information. Disclosing service 244 may maintain for each notice a reference that associates the one or more tokens of the notice with one or more URLs of the protectable hits. In addition to the tokens discussed above, the notice of protectable hits may include identification of the initial request for search, the primary query, the date-time of the request for search, and the name of administrator 210 that approved the second permit.

In response to the notice of protectable hits, requester 208 may send to disclosing service 244 a request for protectable content. The request for protectable content may include information derived from the notice of protectable hits such as one or more tokens.

On receiving a request for protectable content, a disclosing service may screen the request to assure that it is being made within the scope of the first permit and the second permit (e.g., expiration date, requester of protectable content is same as or authorized by the requester of the initial request for search). If so, the disclosing service may prepare branded content and send the same to the requester. For example, disclosing service 244 may, according to the conditions (e.g., specified requester, expiration dates) of first and second permits, using the information provided by each protectable hit of the proxy search (and any additional scope defined by each first permit), obtain protectable information from each agency site 214, add brands referred to in registration records or as directed by gateway operating policy, and send the branded content to requester 208.

An analyzing-events service facilitates managing workflows for various requests, permits, and disclosures that pass through system 100, gateway site 140, and services 200. Workflows that are not proceeding may be the subject of notices to services, administrators, and/or agents. A workflow includes any sequence of processing and/or communication that has a defined end state or states and may be interrupted (e.g., by lack of resources to accomplish the processing and/or communication) so as not to reach a suitable end state by an expected date-time. An event may include any change of status (e.g., a status field of a record) posted by a service such as: a new or amended registration record posted by registering service 232, allowing or prohibiting access to an index 264 as posted by obtaining indexes service 236, the history of handling of a request for proxy search as posted by private-searching service 240, the handling of protectable hits and first permits as posted by gating service 242, and the handling of authorizations to disclose and second permits as posted by disclosing service 244. In addition, at the expiration of the first and/or second permit, disclosing service 244 may send a suitable notice to agency 206, administrator 210 and/or requester 208 to destroy copies of delivered branded content that corresponds to the permits. Suitable certificates of such destruction may be provided by administrator 210 through disclosure service 244 and/or gating service 242 to administrator 216.

An analyzing-events service may report backlogs of unaddressed access requests (e.g., requests for first permit and/or requests for second permit) to a sequence of users beginning with the administrators (210, 216) discussed above. The information collected during registration of an agency may identify a sequence of roles and one or more administrators for each role (e.g., customer service representatives, supervisors of those representatives, managers of those supervisors). Individual reports of backlogs may be prepared (e.g., filtered) with reference to time period criteria for each role (e.g., supervisors are notified of requests that are stale by more than 12 hours, managers are notified of requests that are stale by more than 24 hours). An access policy developed from information collected during registration of an agency may further include definitions of the roles, time period criteria, and agents (administrators) for each role. If an analyzing-events service determines that a backlog exceeding a limit exists, the analyzing-events service may inform other users and/or take remedial action. Informing other users may include reporting the backlog by agency to agents of other agencies. Remedial action may include adjusting registration information for the source agency (e.g., and its agents) to which the backlog applies to decrease the benefits of use of the gateway site, and/or to increase the cost for use of the gateway site.

Gateway site 140 may determine for a particular requester with reference to a result of registration or substantiation whether or not protectable information is to be included in response to a request for search. This determination may override data to the contrary (if any) provided by the requester. Whether or not a requester will receive protectable information may be covertly determined and/or updated by gateway site 140.

Gateway site 140 may include in a request for access a date from which the requester has been continuously qualified to receive protectable information. Gateway site 140 may include in a request for access the quantity of hits identifying protectable information that may be traced to requests for search initiated by the particular requester associated with the subject request for access. The dates these searches were requested may be included. The corresponding sources of protectable information may be identified or omitted by gateway site 140. A summary of the status (e.g., priority, denied, permitted, on hold) of some or all such requests may also be provided as part of a request for access. Consequently, for example, a request for access from a requester who has a relatively short duration of experience, who is responsible for numerous pending requests for access, and/or whose requests for access are often delayed or denied by particular agencies may be evaluated by a human administrator and may require particular substantiation before a permit is provided by a source agency.

A gateway site may refer to a database for performing the functions of a gateway site and/or the methods discussed above. A database may include any number of data structures of various types including records, lists, tables, indexes, cross-references, and hybrid lists. Instances of each of these data structures may be modeled as a matrix of columns and rows where rows generally have the same structure, columns correspond to fields, and an intersection of a row and column defines a cell (or record field) having a value (e.g., values in the same column but of different rows have the same purpose corresponding to the field name). Any two or more values of a data structure (e.g., a record, column. or row) comprise a tuple by implementing an association (e.g., a relationship) between the values. A relational database is preferred. A relational database may be constructed from the descriptions of functions discussed above. A database of any other architecture may be used with conventional database technology and/or information storage technology.

For example, information store 142 may include a database 300 having a logical organization of the type described by the entity relationship diagram of FIG. 3. An entity relationship diagram consists of lines and boxes that describe a database for implementation using any conventional technology (e.g., relational database technology). Each box indicates a table; and each line indicates a cross-reference list. Every record of a table has a key field. Every record of a cross-reference list has a key field of each box the line touches. Database 300 includes searches table 302, registrations table 304, indexes table 306, access policies table 308, brands table 310, requests for access (also called access requests) table 312, permits table 314, hits table 316, search events table 332, registration events table 334, index events table 336, access policy events table 338, brand events table 340, request for access events (also called access request events) table 342, permit events table 344, and hit events table 346. Database 300 also has cross-reference lists 350-358, and 372-386 that associate records of the associated tables in any manner (e.g., many-to-many). Cross-reference lists 350-356, and 372-386 have records wherein each record has two values, one for each key of the table records (two of them) being associated. Cross-reference list 358 includes records wherein each record has seven values, one for each key of the table records being associated. Record structures for database 300 are described in Tables 1 through 9. Access to any of these tables (e.g., alphabetical order on different fields or combinations of fields) may be facilitated by any number of conventional indexes (not shown). More than one field may be implemented to realize the variety of information indicated in the field value description.

TABLE 1

| Field | Field Value Description of Searches Table 302 |
|---|---|
| search-id | A unique key field value for every record. |
| requested-date-time | Searches may be requested in batches and performed at a future time depending on the priority of the request for search. |
| search-criteria | Values used to determine whether an index entry is within the scope of the search (e.g., a hit) (also loosely called a match) or not; values may be numeric, text, graphics, audio, and/or video. Criteria may specify algorithms that produce values (e.g., regular expressions, wild cards); and/or algorithms for determining a match (e.g., type of fingerprint analysis, type of facial recognition, thesaurus in appropriate language, variations on given names for appropriate culture). |
| search-priority | An integer value that may be based on user input with the request for search, requester type, and/or registration information (e.g., high ranking agent of a particular agency). Server 140 may establish a priority based on registration information of the requesting and source agencies to be included in the search. |
| scope of search | Specifies a white list and/or black list of source agencies that may be included and/or excluded based on registration information. |
| status | May include created, scheduled, proceeding, held, cancelled, completed without hits, completed with hits. |

TABLE 2

| Field | Field Value Description of Registrations Table 304 |
|---|---|
| registration-id | A unique key field value for every record. |
| registrant-type | May include values describing: registrant is a requester and is an individual not associated with an agency; registrant is a requester and is an individual associated with an agency; registrant is a requester and is an agency site; registrant is a requester and is an administrator for an agency; registrant is a source of protectable information and is an administrator associated with an agency; registrant is a source of protectable information and is an agency site |
| registrant-name | Full legal name of an individual or agency |
| agent-of | Registration-id of the individual's employer or of the association to which the agent is a member |
| contact | Any number of the following types of information including numerous of the same type: physical address, mailing address, FAX, phone, email, text message address. Contacts may be ordered and given a contact-ordinal to identify numerous attempts at contacting an agent or administrator. |
| status | May include values for application received, pending substantiation, renewal of substantiation, substantiated ok, substantiation failed, hold, open, or closed. |

TABLE 3

| Field | Field Value Description of Indexes Table 306 |
|---|---|
| index-id | A unique key field value for every record. A local copy of an index stored on information store 142 supports searching of and identifying information held on an agency site without placing a processing burden on the agency site. An index itself may include records that specify a term and a URL. If the term of an index record is within the search criteria, then the URL is treated as a hit-URL. An index stored on an agency site may be the object of a proxy request for search by gateway site 140. |
| index-name | Name of the index (e.g., file name) |
| is-private | Whether the information being indexed is public or is (private) protectable information. |
| provided-by | Registration-id of the agency that provided the index. |
| effectivity-begin | Date-time for beginning use of the index for searches by gateway site 140. |
| effectivity-end | Date-time for ending use of the index for searches by gateway site 140. |
| term-type | Description of the type of value that may be used as a prospective match for the term field values given in the index. |
| subscription | Describes when and how to obtain (automatically or manually) the initial and updated versions of the index. May include a URL of an agency site copy of the index to be copied for local searching. May specify a destination that receives requests for search (e.g., proxy searches by gateway site 140). |
| utilization | May specify how searching should be attempted: local searches only (index exists on information server 142), proxy searches only (index exists on agency site 150 or 162), or local searching with fail-over to proxy searching. |
| status | May specify use proxy search, use local index loaded and not available, use local index loaded and available, copy of local index is expired. |

TABLE 4

| Field | Field Value Description of Access Policies Table 308 |
|---|---|
| policy-id | A unique key field value for every record. When a registrant is a source type of registrant, the registrant may specify for each type of requester (e.g., requester-type) a policy that limits, defines, or expands the scope of disclosure to be made to that type of requester. |
| verification | May specify what information in the corresponding registration record requires verification prerequisite to disclosure (e.g., prior to providing a permit). |
| policy-per-requester-type | A value dictating: no disclosure, requester's hit only, requester's hit plus hits from administrator's query, or only hits from administrator's query. |
| disclosure-subscription | Whether requester gets updates and how often. For example, may specify to supply an update when requester's hit content changes, when hits (or content) from administrator's query change, scheduled re-run of requester's or administrator's queries (e.g., repeat 3 times after each subsequent lapse of 7 days), reference to a detailed subscription to a query re-run service). |
| policy-period | May refer to a calendar to define date-time periods that may limit disclosure (e.g., limit providing permits) to business hours and week days except holidays. |
| policy-effectivity-begin | Date-time that access policy becomes effective. If no access policy is effective, all access may be denied. |
| policy-effectivity-end | Date-time that a source type of registrant must review and renew its access policy. |
| administrator-query | Method, rules, or regular expression that defines how to derive a suitably limited or expanded query from the requester's query and/or protectable hit. |
| brand-policy | May specify whether or not one or more brands are to be added to the permitted disclosed content. For example, brands may include the gateway site entity's brand, the source agency's brand, the source agency's administrator's signature, the requester's |

TABLE 4-continued

| Field | Field Value Description of Access Policies Table 308 |
|---|---|
| | administrator's signature, the requester's agency's brand. Copyright notices may also be specified as desired. |
| status | May specify policy on hold, in force, suspended, cancelled. |

TABLE 5

| Field | Field Value Description of Brands Table 310 |
|---|---|
| brand-id | A unique key field value for every record. One or more brands and/or copyright notices may be added to the presentation of protectable information. Brands and/or notices may be used to assert protection under contract and/or trademark law and to identify the source (if desired) and/or quality of the information and/or the authorizations. An authorized signature may be used as a brand. |
| brand | A graphics image or animation representing the brand. Encryption technologies may be used (e.g., electronic signatures, keys) in addition to or in combination with brands to evidence or deter tampering with the brand or the branded content. |
| status | May specify on hold, active, suspended, cancelled |

TABLE 6

| Field | Field Value Description of Requests for Access Table 312 |
|---|---|
| access-request-id | A unique key field value for every record. A request for access may be assembled from the information stated in a record of the Access Requests table and supplemented with information referred to from cross-reference 358 (e.g., specifics of the particular search, particular hits, requester, sources, administrators) |
| contact-ordinal | Specifies the contact information last used in attempting to deliver arequest for access |
| expires | Specifies date-time that if no reply is received, then no further attempts at delivery will be made. |
| priority | May be derived from registration information and/or search-priority. |
| status | May specify pending first delivery attempt, sent and not replied to, replied to, closed |

TABLE 7

| Field | Field Value Description of Permits Table 314 |
|---|---|
| permit-id | A unique key field value for every record. |
| permit-type | Two types of permits may be used. A source administrator may permit or deny access. A requester's administrator may permit or deny access. |
| source-contact-ordinal | Specifies the contact information last used in attempting to deliver a permit to a source administrator. |
| requester-contact-ordinal | Specifies the contact information last used in attempting to deliver a permit to a requester's administrator. |
| copy-status | Describes gateway site 140 responsibility to obtain a copy of protectable information and store it on information store 142: do not copy, copy scheduled, copy in process, copy available, copy removed. |
| access-start | Specifies date-time requester may use hit-access to access protectable information. |
| access-stop | Specifies date-time requester will no longer have access to protectable information. |
| priority | May be derived from registration information and/or search-priority. |

TABLE 7-continued

| Field | Field Value Description of Permits Table 314 |
|---|---|
| source-status | May specify pending first delivery attempt, sent and not replied to, granted, closed. |
| requester-status | May specify pending first delivery attempt, sent and not replied to, granted, closed. |

TABLE 8

| Field | Field Value Description of Hits Table 316 |
|---|---|
| hit-id | A unique key field value for every record. |
| protectable-URL | A result of either a local search or a proxy search. |
| token | An arbitrary value assigned to hide the true value of the protectable-URL from the requester |
| status | Indicates whether disclosure occurred. May specify the date-time of disclosure (if any). |

TABLE 9

| Field | Field Value Description of Cross-reference List 358 |
|---|---|
| search-id | For every request for search that is received, a record is posted to searches table 202 and cross-reference list 358. For every resulting hit, request for access, and permit, respective records are posted to suitable tables and additional records are posted to cross-reference list 358. |
| registration-id | Identifies the requester, for example from the request for search. |
| index-id | Identifies the index that produced the associated hit-id and thereby indirectly identifies the source of the protectable information. |
| hit-id | Identifies one of the hits (or matches) within the scope of the search criteria. |
| access-policy-id | Identifies a policy for access (if any) associated with the hit-id. |
| access-request-id | Identifies a request for access (if any) associated with the hit-id. If more than one request for permit is involved in an access request, a record structure having more than one access-request-id field may be used. |
| permit-id | Identifies a permit (if any) associated with the hit-id. If more than one permit is involved in an access request, a record structure having more than one permit-id field may be used. |

The event tables 332-346 may have uniform structure to simplify combining the information from them into a single transaction report. An event may include a new record posting to the respective table, a change in status, and/or an amendment to a field value. An event record may include a date-time value for the date and time the event occurred in association with a description of the event. The description of the event may include an event type, a new value of the status, and/or a name of the field and the new value for that field.

Analysis of the events tables 332-346 may provide metrics used for throughput analysis, billing for services, decisions about retiring indexes for nonuse, advising agencies of unusual patterns of registration events, tracing the timing of disclosures, tracing the authorizations of disclosures, managing workflows, and/or managing the load on services supported by gateway site 140.

Additional processes may maintain the accuracy, authority, consistency, linking, reliability, and current status of the tables, indexes, cross-references, hybrids, and records discussed above.

Figure 4:
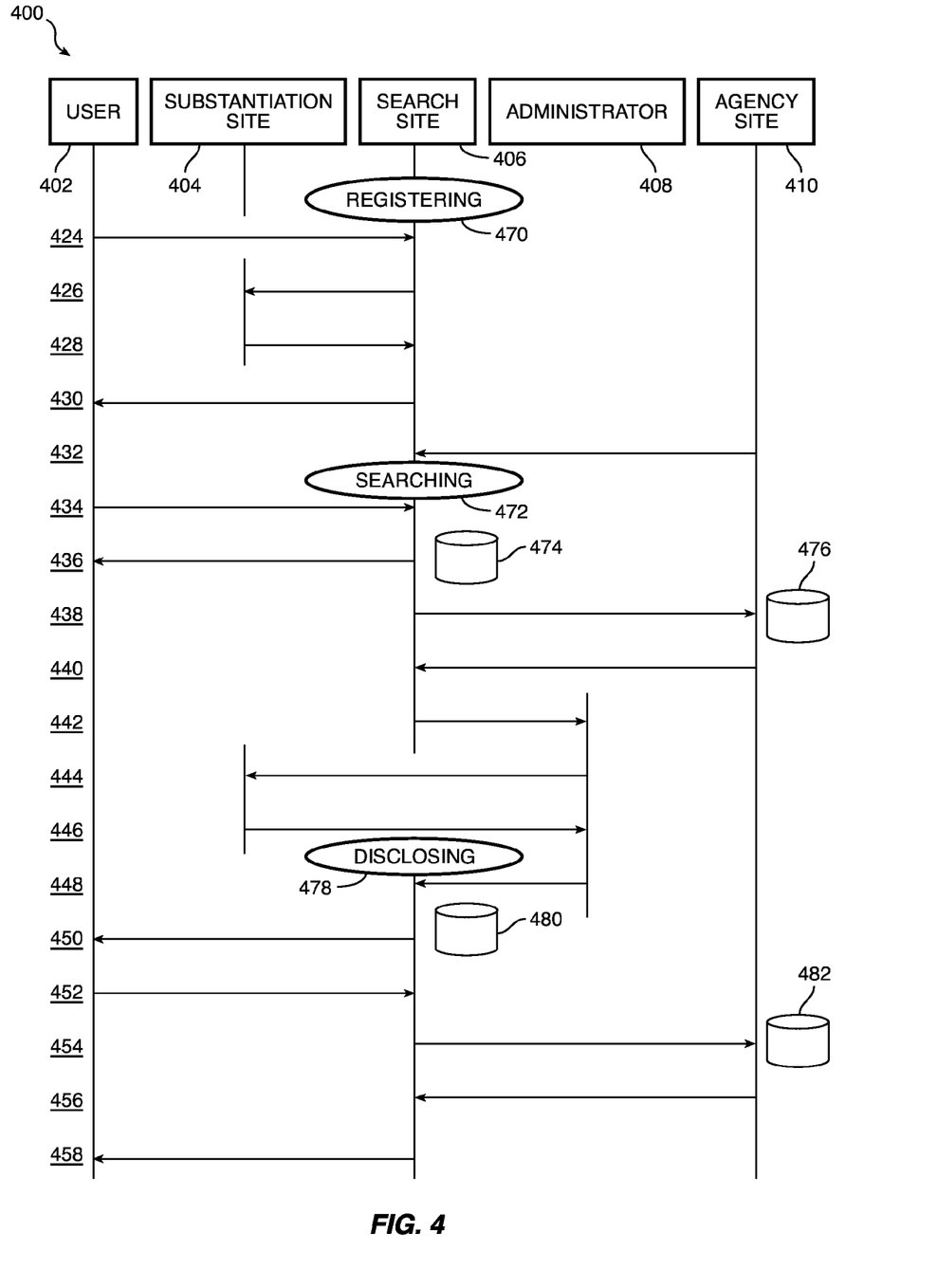
FIG. 4 is a message sequence diagram according to various aspects of the present invention.

In one implementation of a method of searching 400 of FIG. 4, a user 402, substantiation site 404, a search site 406, an administrator 408, and an agency site 410 communicate in a sequence of messages. At time 424 user 402 provides registration information to search site 406. Registration process 470 receives the information and assures that required information is provided. Registration information may be used later to describe and identify the user to administrator 408 of agency site 410. Search site 406 may provide a blank registration page (not shown) asking for identifying information and the user's basis for being trusted with protectable information that may result from searches. The requested information may be conveyed to search site 406 at time 424. Basis for trust may include certification that the agency that employs user 402 has met and continues to meet conventional criteria for high quality control of confidential information.

At time 426 registration process 470 asks for verification of information received at time 424. Verification is provided by substantiation site 404. Substantiation site 404 may have information from corroborating sources. Substantiator site 404 may be operated by a union, association of agencies, or government. Access to substantiator site 404 may be by subscription. Data being substantiated may be nonpublic information. For example, the name of user 402's employer may be verified as a type of employer for which collaboration with agency 410 is suitable. Current employment, training, and level of authority may be verified.

At time 428 registration process 470 receives information from substantiation site 404. Dialog 426 and 428 may be repeated for several substantiation sites for the same information; or, one or more substantiation sites for each type of information provided in the request for registration 424. Registration process 470 determines if the response information 428 meets subscriber qualifications for user 402 and if so enters a subscription for user 402 to use site 406.

At time 430 notice of the subscription is sent from search site 406 to user 402. Notice may include a username and password. Notice may further include graphics for user verification, special questions that help identify user 402 from imposters, and mechanisms to inhibit registration by automated imposters.

At time 432 each agency that desires to collaborate by sharing protectable information subscribes to use search site 406. Additional messages of the type described with reference to messages at times 426-430 follow (not shown). Searching process 472 adds a URL for agency site 410 to its list of sites to search for protectable information.

At time 434 user 410 (assuming a proper login dialog has completed successfully) presents from a browser a query for a search in a conventional manner. For example, an image of a face and an image of a fingerprint may be submitted as search criteria. A name in text or in audio may be submitted. Data prescribing generalization and/or abstraction may be submitted. A street address or location may be submitted in text or audio. Suitable transcription of audio may be accomplished by searching process 472. Suitable analysis of images may be made by searching process 472 to determine additional search criteria. Conventional transcription and image analysis may be used. Searching process 472 then makes a conventional search of public information using data stored on information store 474 at site 406. Such data may include one or more indexes and may further include documents and other content. When documents or other content are not included, the index may refer to URLs for obtaining the documents and/or other content corresponding to the index.

At time 436 search results from the search of public content are returned to user 402. There may be no mention of the possibility of a search for protectable information, or the identity of subscribing agencies 410. The return of search results may be within a few seconds. Search results may include URLs that user 410 may browse in a conventional manner. Search requests and/or results may be combined for batch processing by search site 406 and/or user 402.

At time 438 search site 406 augments the search as a proxy for user 402. A secondary query based on the query received at time 434 is sent by search site 406 to each subscribing agency site 410. The secondary query may be encrypted. Search site 406 may be required to successfully complete a login dialog to assure agency site 410 that it is not an imposter. The secondary query may accomplish a search in one of two ways. First, a search engine at agency site 410 may refer to indexes and/or content stored on information store 476 at agency site 410 and send hits to search site 406. Second, a search engine at site 406 may refer to indexes stored on information store 474 received from agency 410. Indexes may be received with subscription information at time 432. Otherwise a request for indexes may be included in the request at time 438 and conveyed to search site 406 at time 440. Such indexes may be sparse to prevent recreating documents from data on information store 474. Such indexes may omit some of the content at agency site 410. Selected content and/or selected types of content may have been indexed.

At time 440 one or more secondary hits are sent back to search site 406. Hits may be encrypted. Alternatively, indexes are received at site 406 and the query proceeds with a local search engine at time 406 referring to indexes received and stored on information store 474. Either way, searching process 472 obtains one or more secondary hits.

At time 442 search site 406 notes that there is at least one secondary hit from at least one agency with regard to protectable information stored at the agency on information store 476. A request for a permit to disclose information related to each secondary hit is made to an administrator (human) or administrating process (automated) 408.

At time 444, administrator 408 knows the identity of user 402 because that information was included in the request at time 442. Administrator 408 may contact substantiator 404 to verify the identity and current trust certifications for user 402.

At time 446 administrator 408 receives verification and/or corroborating information from substantiation site 404.

At time 448 administrator 408 may consider other factors in determining whether to allow disclosure of some or all of the content referred to in the secondary hit. These factors may be implemented in rules for automated decision making. These factors may be implemented in rules for collecting information of the basis for human decision making. As a result of human, semi-automated, or automated decision making, administrator 408 sends a permit or notice of denial to search site 406. The permit may be limited to a period of time and/or one or more subscribers (e.g., agents and/or agencies). The set of subscribers may omit user 402 and include another user as an agent for (or supervisor of) user 402.

At time 450, assuming a permit was received at time 448, search site 406 facilitates access to the content referred to in the one or more secondary hits. The name and location of the content may be hidden from disclosure to user 402. For example, an arbitrary token may be associated with the true URL of the content and the association stored on information store 480 of site 406. The arbitrary token may be sent to user 402 at time 450. Preferably, user 402 receives prompt notice of additional results of his query initiated at time 434.

At time 452, which may be at any time convenient to user 402, user 402 (assuming a successful login dialog) makes a request for the content corresponding to the one or more secondary hits. The request may specify any suitable identification of the secondary hit(s). Requests may be combined for batch processing.

At time 454 search site 406 makes a proxy search based on one of the following: the query or arbitrary token received at time 452; the query received at time 434 along with permits received at time 448; or one or more true URLs from information store 480. Disclosing process 478 may record the identity of the subscriber making the request and the time and date. If any of these criteria are outside the scope of the permit, the request received at time 452 may be denied. The proxy search may be conducted in a manner analogous to that discussed above with reference to messages 438 and 440.

At time 456 each agency 410 sends content corresponding to the one or more secondary hits to search site 406.

At time 458 search site 406 delivers the content received at time 456 to user 402.

In variations of method 400, according to various aspects of the present invention, substantiation site 404 and messages related to substantiating may be omitted when lesser security is acceptable. Registering process 470 may be omitted from search site 406 and hosted elsewhere when another entity is responsible for the registration service.

In any of the search criteria discussed above, data may be included by the requester as to whether access to protectable information is desired or not. If access to protectable information is desired, then operations as discussed above may be performed; otherwise, actions leading to access to protectable information (e.g., proxy searching, local searching, providing requests for access, human decision making, providing permits) may be omitted on a search-by-search basis.

The technologies for managing protectable information discussed above may be applied to managing information held by law enforcement agencies. Queries may include identification of suspects such as written descriptions, sketches, photographs, videos, sound recordings of the suspect's voice, reproductions of finger prints, and forensic reports and analysis. An agency project may include an investigation of a particular crime or other incident, an investigation of a particular person or organization, a focus on a particular set of criminal activities (e.g., drug trafficking, organized crime), or a focus on crime in a particular geographic area. Protectable information may include profiles on suspects, victims, or witnesses; suspect lists, victim lists, witness lists; descriptions of crimes or incidents associated to a person (e.g., suspect, victim, witness, accomplice, convicted criminal, detained person); profiles on organizations (e.g., members, suspected members, missions, leadership, practices, goals, methods of communicating). Because different agencies limited by jurisdictional boundaries may have collected different protectable information regarding the same person or organization who moves or acts among several jurisdictions, an investigation may benefit from obtaining protectable information from many different agencies.

The technologies for managing protectable information discussed above may be applied to managing information held for purposes of medical diagnosis, treatment, disease research, and clinical studies. Queries may include identification of patients, symptoms (e.g., written descriptions, sketches, photographs, videos, sound recordings, lab reports, imaging), doctors, treatment plans, and investigators. Agency projects may include treatment of a particular patient, type of patient, type of symptom, or disease; investigations related to disease control; investigations as to the effects and side-effects of procedures, equipment, and medications; and clinical studies. Protectable information may include all of the above. Because a person may seek medical assistance from many medical service providers, any of the medical service providers may benefit from access to protectable information collected by another medical service provider.

The technologies for managing protectable information discussed above may be applied to managing information held for business and investment purposes. Queries may include identification of particular persons (e.g., bank and credit account numbers, discount card numbers, residence address, work address), types of persons (e.g., graphics describing spending over time, graphics describing socioeconomic profiles), products and types of products. Agency projects may include city planning, traffic planning; advertising campaigns; product pricing; merger and acquisition plans; supplying areas damaged by disasters or affected by shortages; and relocating businesses. Because such protectable information may be used for diverse purposes, access to protectable information collected by other agencies may make it more likely to accomplish economic growth in an area or avoid economic recession.

An implementation of a system for managing protectable information, according to various aspects of the present invention, may omit a public-searching service. In such an implementation, the request for search from the requester may be acted on by the private-searching service, as otherwise discussed above.

An implementation of a system for managing protectable information, according to various aspects of the present invention, may determine that the protectable information is subject to laws requiring its disclosure on request (e.g., in the USA, the Freedom Of Information Act). The information collected during registration of an agency may identify protectable information that is subject to laws requiring its disclosure and identify how a requester is to gain access to such information. A private-searching service that identifies a protectable hit (perhaps among many others) that is identified to a source of protectable information that is subject to laws requiring its disclosure may provide notice to that effect to the requester and obtain from the requester a request to obtain access more specifically to such information. A gating service may prepare and present a request for first permit to the source agency as a request that meets legal requirements for disclosure under law. For such information, cooperation of a disclosing service with supervised requesters may be omitted in favor of cooperation as if the supervised requester was an unsupervised requester (e.g., omitting the request for second permit).

U.S. patent application Ser. No. 13/801,752 (101.01875) to Smith filed Mar. 13, 2013; U.S. Pat. No. 9,003,474; and U.S. provisional patent application No. 61/091,267 (101.00503), to Smith filed Aug. 22, 2008 are herein incorporated by reference so that their disclosures may be used in any manner and for any purpose.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'including', and 'having' introduce an open ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

What is claimed is:

1. A system for managing protectable information after a registration process has completed registration of a first agency, a first administrator, a second agency, a second administrator, and a requester, registration being accomplished in accordance with respective credentials of identity, the system comprising:
    a server; and
    one or more portals for electronic communication;
    wherein:
        the server electronically communicates with the requester, the first administrator, and the second administrator via the one or more portals;
        the requester belongs to the first agency;
        the first administrator belongs to the first agency;
        the second administrator belongs to the second agency;
        the server receives information via the one or more portals for accessing protectable information controlled by the second agency;
        the server receives a first request for a search from the requester;
        the server prepares a list of the protectable information that is in accordance with a criteria of the first request;
        the server receives a first permit from the first administrator, the first permit for controlling provision of the list by the server to the requester;
        the server receives a second permit from the second administrator, the second permit for controlling provision of the list by the server to the requester;
        in accordance with the first permit and the second permit, the server provides electronic access to the protectable information of the list to the requester.

2. The system of claim 1 wherein prior to receiving the first permit, the server transmits a second request for the first permit to the first administrator.

3. The system of claim 2 wherein the second request includes an identity of the requester.

4. The system of claim 2 wherein the second request includes an identity of the second agency.

5. The system of claim 2 wherein the second request includes an identity of the requester and an identity of the second agency.

6. The system of claim 1 wherein prior to receiving the second permit, the server transmits a second request for the second permit to the second administrator.

7. The system of claim 6 wherein the second request includes an identity of the requester.

8. The system of claim 6 wherein the second request includes an identity of the first agency.

9. The system of claim 6 wherein the second request includes an identity of the requester and an identity of the first agency.

10. The system of claim 1 wherein:
    prior to receiving the first permit, the server transmits a second request for the first permit to the first administrator;
    prior to receiving the second permit, the server transmits a third request for the second permit to the second administrator;
    the second request includes an identity of the requester and an identity of the second agency; and
    the third request includes an identity of the requester and an identity of the first agency.

11. The system of claim 1 wherein the list of the protectable information comprises a URL.

12. The system of claim 1 wherein the list of the protectable information comprises a hyperlink.

13. The system of claim 1 wherein the list of the protectable information comprises a hyperlink and a description of the protectable information accessible via the hyperlink.

14. The system of claim 1 wherein:
    the server comprises a database;
    the database stores information gathered during the registration process including a registration for the requester, the first administrator, the first agency, the second administrator, and the second agency respectively.

15. The system of claim 1 wherein the list of the protectable information excludes indicia of an identity of the second agency.

* * * * *